US007835162B2

(12) United States Patent
Lin et al.

(10) Patent No.: US 7,835,162 B2
(45) Date of Patent: Nov. 16, 2010

(54) POWER CONVERTER FOR COMPENSATING A MAXIMUM OUTPUT POWER

(75) Inventors: Chien-Yuan Lin, Pan-Chiao (TW); Wei-Li Hsu, Keelung (TW)

(73) Assignee: System General Corp., Sindian, Taipei County (TW)

( * ) Notice: Subject to any disclaimer, the term of this patent is extended or adjusted under 35 U.S.C. 154(b) by 439 days.

(21) Appl. No.: 12/039,877

(22) Filed: Feb. 29, 2008

(65) Prior Publication Data
US 2008/0309312 A1    Dec. 18, 2008

Related U.S. Application Data

(60) Provisional application No. 60/944,096, filed on Jun. 14, 2007.

(51) Int. Cl.
  *H02M 3/335*  (2006.01)
  *H02H 7/122*  (2006.01)
(52) U.S. Cl. ............... 363/21.01; 363/56.01; 363/56.09
(58) Field of Classification Search ................... 363/20, 363/21.01, 21.11, 55, 56.01, 56.09, 95, 97, 363/98, 131
See application file for complete search history.

(56) References Cited

U.S. PATENT DOCUMENTS

| 4,531,096 A * | 7/1985 | Yokoyama | 330/10 |
|---|---|---|---|
| 7,259,525 B2 * | 8/2007 | Yang | 315/291 |
| 7,564,903 B2 * | 7/2009 | Yang | 375/257 |
| 2005/0219870 A1 * | 10/2005 | Yang et al. | 363/21.01 |
| 2006/0013020 A1 * | 1/2006 | Aso | 363/21.01 |
| 2007/0091651 A1 * | 4/2007 | Jang | 363/21.01 |

\* cited by examiner

*Primary Examiner*—Bao Q Vu
*Assistant Examiner*—Jeffrey Gblende
(74) *Attorney, Agent, or Firm*—Chun-Ming Shih

(57) ABSTRACT

A power converter and a PWM controller for compensating a maximum output power includes a power switch, an oscillator, a control circuit and a delay modulator. The oscillator generates a pulse signal. The control circuit is coupled to the oscillator for generating a PWM signal and an over current signal in response to the pulse signal and a current sense signal of the power converter. The delay modulator is coupled to the control circuit for generating a delay control signal in response to the PWM signal and the over current signal, wherein the delay control signal is used to prolong a propagation delay time of the control circuit in response to the on-time of the PWM signal, and the propagation delay time can be compensated by the on-time of the PWM signal to limit the maximum output power under a high-line input voltage and a heavy-load condition.

14 Claims, 3 Drawing Sheets

POWER CONVERTER FOR COMPENSATING A MAXIMUM OUTPUT POWER

CROSS-REFERENCE

This application claims priority from U.S. Provisional Patent Application No. 60/944,096, filed on Jun. 14, 2007.

BACKGROUND OF THE INVENTION

1. Field of the Invention

The present invention relates to a power converter, and more particularly, to a power converter used for compensating a maximum output power.

2. Description of Related Art

Power converters are generally used to power many of electronic devices. The pulse-width modulation (PWM) technique is a conventional technology used in a power converter to control and regulate the output power. Various protection functions are built-in in the power converter to protect the power converter from permanent damage. The function of compensating maximum output power is commonly used for overload and short-circuit protections.

FIG. 1 shows a traditional power converter. The power converter includes a power transformer $T_1$ having a primary winding $N_P$ and a secondary winding $N_S$. The power transformer $T_1$ is to provide galvanic isolation between an AC line input and an output of the power converter for safety. The primary winding $N_P$ is supplied with an input voltage $V_{IN}$ of the power converter. In order to regulate an output voltage $V_O$ of the power converter, a control circuit coupled in series with the primary winding $N_P$ of the power transformer $T_1$ generates a PWM signal $V_{PWM}$ in response to a feedback signal $V_{FB}$. The control circuit comprises an oscillator 10, a first comparator 31, a second comparator 32, a logic circuit 33, and a flip-flop 20. The PWM signal $V_{PWM}$ controls a power switch $Q_1$ to switch the power transformer $T_1$. A current-sense resistor $R_S$ is connected in series with the power switch $Q_1$ to determine the maximum output power of the power converter. The current-sense resistor $R_S$ turns a switching current $I_P$ of the power transformer $T_1$ to a current-sense signal $V_{CS}$. The current-sense signal $V_{CS}$ is coupled to the control circuit. If the current-sense signal $V_{CS}$ is greater than a limit signal $V_M$ through the first comparator 31, the control circuit is coupled to disable the PWM signal $V_{PWM}$, and it also restricts the maximum output power of the power converter.

FIG. 2 shows the signal waveforms of the PWM signal and the current-sense signal of the power converter in FIG. 1. As the PWM signal $V_{PWM}$ becomes logic-high, the switching current $I_P$ will be generated accordingly. A peak value $I_{P1}$ of the switching current $I_P$ can be given by, $$I_{P1} = \frac{V_{IN}}{L_P} \times T_{ON} \quad (1)$$

The maximum output power $P_O$ can be expressed by, $$P_O = \frac{L_P}{2 \times T_S} \times I_{P1}^2 = \frac{V_{IN}^2 \times T_{ON}^2}{2 \times L_P \times T_S} \quad (2)$$

In Equations (1) and (2), $L_P$ is the inductance of the primary winding $N_P$ of the transformer $T_1$, and $T_{ON}$ is an on-time of the PWM signal $V_{PWM}$ while the power switch $Q_1$ is switched on, and $T_S$ is the switching period of the PWM signal $V_{PWM}$.

From Equation (2), we find that the output power varies as the input voltage $V_{IN}$ varies. The input voltage ranges between $90V_{AC}$ and $264V_{AC}$ when the safety regulations are taken into consideration, and wherein the power limit in a high-line input voltage is many times higher than the power limit in a low-line input voltage. There is a delay time $T_D$ from the moment the voltage in current-sense signal $V_{CS}$ is higher than the limit signal $V_M$ to the moment the PWM signal $V_{PWM}$ is actually turned off. The maximum output power is also affected by the delay time $T_D$ of the control circuit. In the period of the delay time $T_D$, the power switch $Q_1$ is still turned on, and it keeps on-state for delivering the output power. Therefore, the actual on-time of the PWM signal $V_{PWM}$ is equal to $T_{ON}+T_D$, and the actual maximum output power $P_O$ becomes as follows:

$$P_O = \frac{V_{IN}^2 \times (T_{ON} + T_D)^2}{2 \times L_P \times T_S} \quad (3)$$

Although the delay time $T_D$ is short, generally within the range of 200 nsec~350 nsec, the higher operating frequency and smaller switching period $T_S$, the more influential impact is caused by the delay time $T_D$. Therefore, the input voltage should be compensated properly, such that the input voltage does not affect the maximum output power.

SUMMARY OF THE INVENTION

An objective of the invention is to provide a power converter and a PWM controller for compensating a maximum output power.

The present invention provides a power converter for compensating a maximum output power. The power converter includes a power switch, an oscillator, a control circuit and a delay modulator. The power switch is coupled to a primary winding of the power converter for switching a power transformer, and the power transformer is supplied with an input voltage of the power converter. The oscillator generates a pulse signal. The control circuit is coupled to the oscillator for generating a PWM signal and an over current signal in response to the pulse signal and a current sense signal of the power converter, wherein the PWM signal controls the power switch, and the over current signal is activated for cycle-by-cycle limiting an on-time of the PWM signal once the current sense signal is higher than a limit signal. The delay modulator is coupled to the control circuit for generating a delay control signal in response to the PWM signal and the over current signal, wherein the delay control signal is used to prolong a propagation delay time of the control circuit in response to the on-time of the PWM signal, and the propagation delay time can be compensated by the on-time of the PWM signal to limit the maximum output power under a high-line input voltage and a heavy-load condition, and the propagation delay time can be adjusted to achieve an identical maximum output power between a low-line input voltage and the high-line input voltage.

Furthermore, the present invention provides a PWM controller for compensating a maximum output power. The power converter includes an oscillator, a control circuit and a delay modulator. The oscillator generates a pulse signal. The control circuit is coupled to the oscillator for generating a PWM signal and an over current signal in response to the pulse signal and a current sense signal of the power converter, wherein the PWM signal controls a power switch, and the over current signal is activated for cycle-by-cycle limiting an on-time of the PWM signal once the current sense signal is higher than a limit signal. The delay modulator is coupled to the control circuit for generating a delay control signal in response to the PWM signal and the over current signal, wherein the delay control signal is used to prolong a propagation delay time of the control circuit in response to the on-time of the PWM signal, and the propagation delay time can be compensated by the on-time of the PWM signal to limit the maximum output power under a high-line input voltage and a heavy-load condition, and the propagation delay time can be adjusted to achieve an identical maximum output power between a low-line input voltage and the high-line input voltage.

DETAILED DESCRIPTION OF PREFERRED EMBODIMENTS

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

Figure 1:
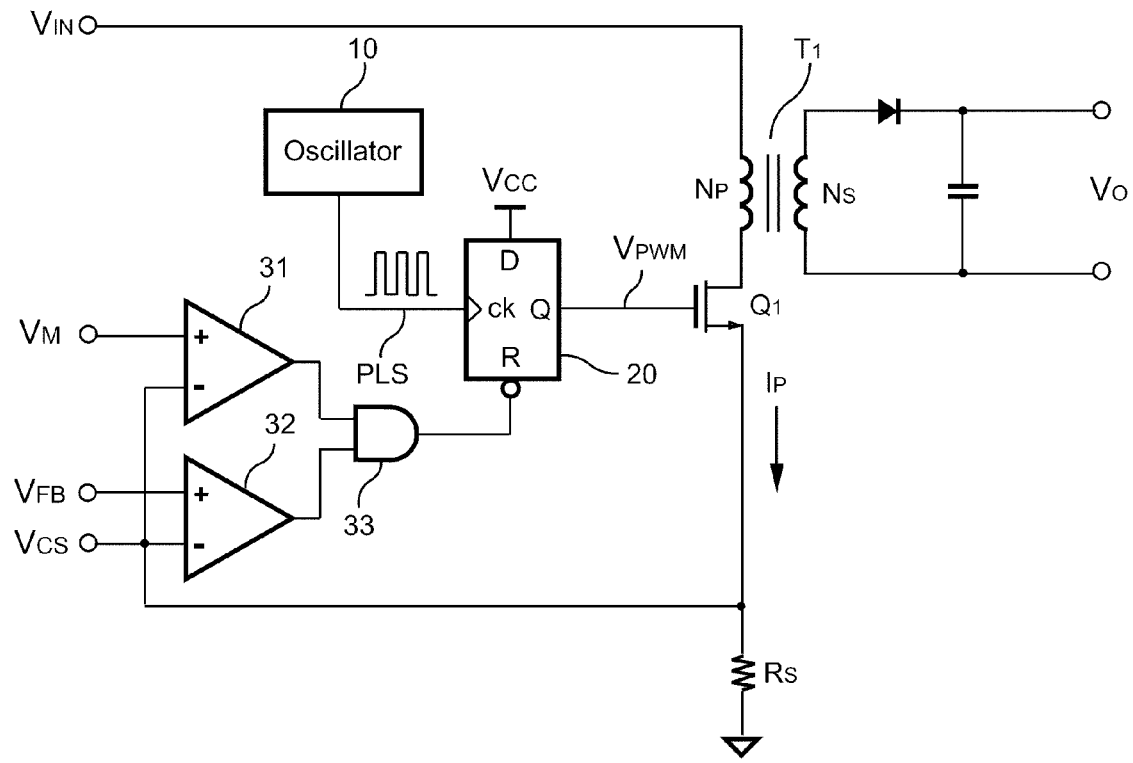
FIG. 1 shows a traditional power converter.
Figure 2:
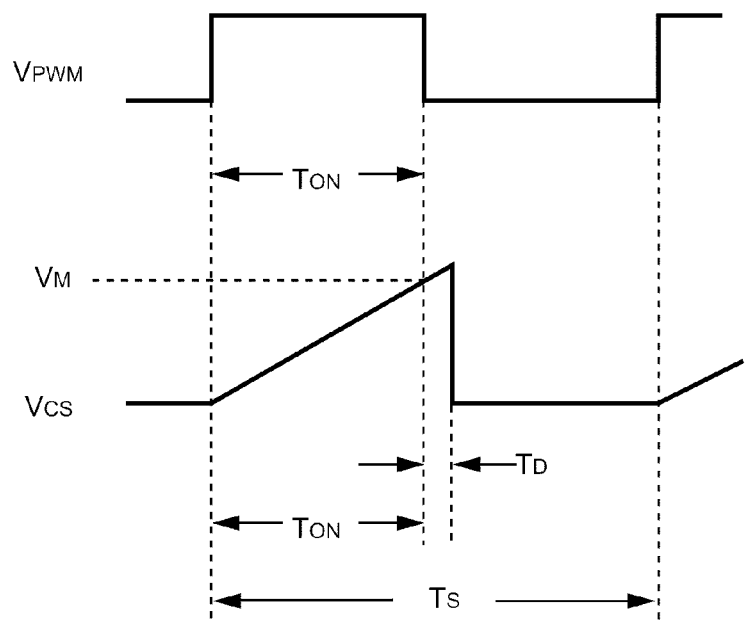
FIG. 2 shows the signal waveforms of the PWM signal and the current-sense signal of the traditional power converter.
Figure 3:
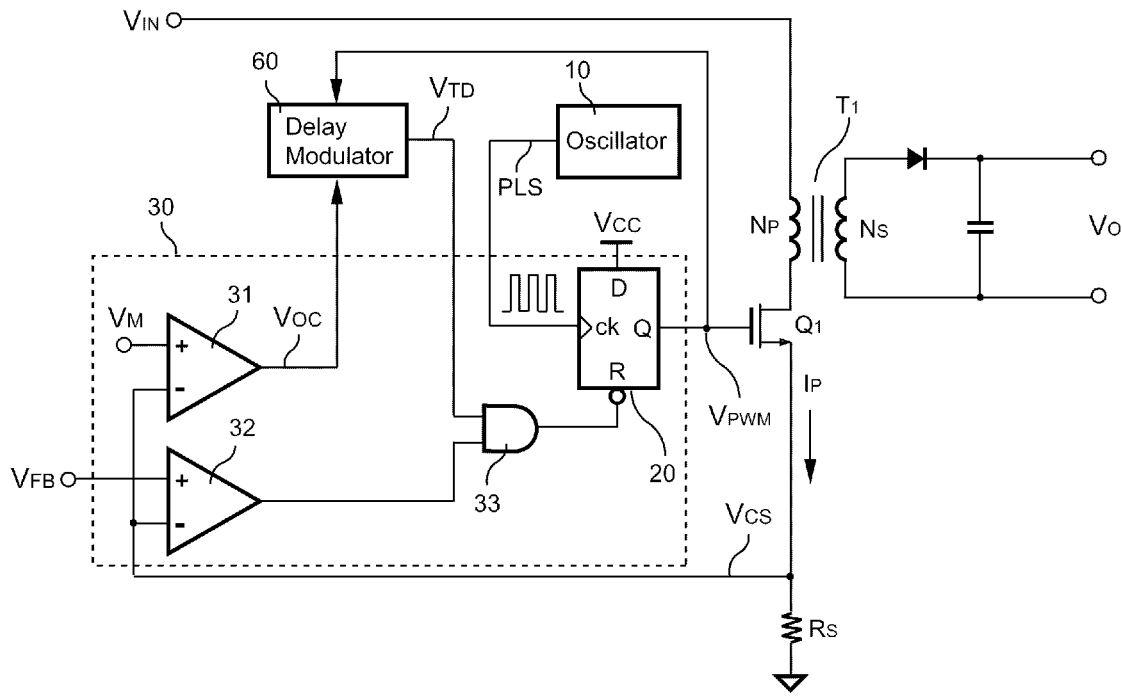
FIG. 3 shows a power converter having a PWM controller in accordance with the invention.

FIG. 3 shows a circuit diagram of a power converter according to an embodiment of the invention. The power converter includes a power switch $Q_1$ and a PWM controller. The power switch $Q_1$ is coupled to a primary winding of the power converter for switching a power transformer $T_1$. The power transformer $T_1$ has the primary winding $N_P$ and a secondary winding $N_S$. The power transformer $T_1$ transfers the stored energy from the primary winding $N_P$ to the secondary winding $N_S$. The primary winding $N_P$ of the power transformer $T_1$ is supplied with an input voltage $V_{IN}$ of the power converter. In order to regulate an output voltage $V_O$ of the power converter, the PWM controller is coupled in series with the primary winding $N_P$ of the power transformer $T_1$ to generate a PWM signal $V_{PWM}$ in response to a feedback signal $V_{FB}$.

In one embodiment, the PWM controller comprises an oscillator 10, a control circuit 30 and a delay modulator 60. The control circuit 30 comprises a flip-flop 20, comparators 31, 32 and a logic circuit 33. The oscillator 10 generates a pulse signal PLS to the flip-flop 20. The flip-flop 20 generates the PWM signal $V_{PWM}$ in response to the pulse signal PLS and an output terminal of the logic circuit 33. The PWM signal $V_{PWM}$ controls the power switch $Q_1$ to switch the power transformer $T_1$. In general, the input voltage ranges between $90V_{AC}$ and $264V_{AC}$ when the safety regulations are taken into consideration, and wherein the maximum output power in a high-line input voltage is many times higher than the maximum output power in a low-line input voltage. An on-time $T_{ON}$ of the PWM signal $V_{PWM}$ is correlated to an amplitude of the input voltage $V_{IN}$. Therefore, the on-time $T_{ON}$ of the PWM signal $V_{PWM}$ is decreased in response to the increase of the input voltage $V_{IN}$, and the on-time of the PWM signal $V_{PWM}$ is increased in response to the decrease of the input voltage $V_{IN}$.

The control circuit 30 is coupled to the oscillator 10 for generating the PWM signal $V_{PWM}$ and an over current signal $V_{OC}$ in response to the pulse signal PLS and a current sense signal $V_{CS}$ of the power converter, wherein the PWM signal $V_{PWM}$ controls the power switch $Q_1$, and the over current signal $V_{OC}$ is activated for cycle-by-cycle limiting the on-time $T_{ON}$ of the PWM signal $V_{PWM}$ once the current sense signal $V_{CS}$ is higher than a limit signal $V_M$. The delay modulator 60 is coupled to the control circuit 30 for generating a delay control signal $V_{TD}$ in response to the PWM signal $V_{PWM}$ and the over current signal $V_{OC}$, wherein the delay control signal $V_{TD}$ is used to prolong a propagation delay time $T_D$ of the control circuit 30 in response to the on-time $T_{ON}$ of the PWM signal $V_{PWM}$. The propagation delay time $T_D$ can be compensated by the on-time $T_{ON}$ of the PWM signal $V_{PWM}$ to limit the maximum output power under a high-line input voltage and a heavy-load condition. The propagation delay time $T_D$ can be adjusted to achieve an identical maximum output power between a low-line input voltage and the high-line input voltage.

The on-time $T_{ON}$ of the PWM signal $V_{PWM}$ is correlated to an amplitude of the input voltage $V_{IN}$, wherein on-time $T_{ON}$ of the PWM signal $V_{PWM}$ is decreased in response to the increase of the input voltage $V_{IN}$, and the on-time $T_{ON}$ of the PWM signal $V_{PWM}$ is increased in response to the decrease of the input voltage $V_{IN}$. The objective of the present invention is to develop an adjustable propagation delay time in accordance with the on-time of the PWM signal $V_{PWM}$ and the amplitude of the input voltage $V_{IN}$. The propagation delay time of the high-line input voltage is shorter than the propagation delay time of the low-line input voltage.

Figure 4:
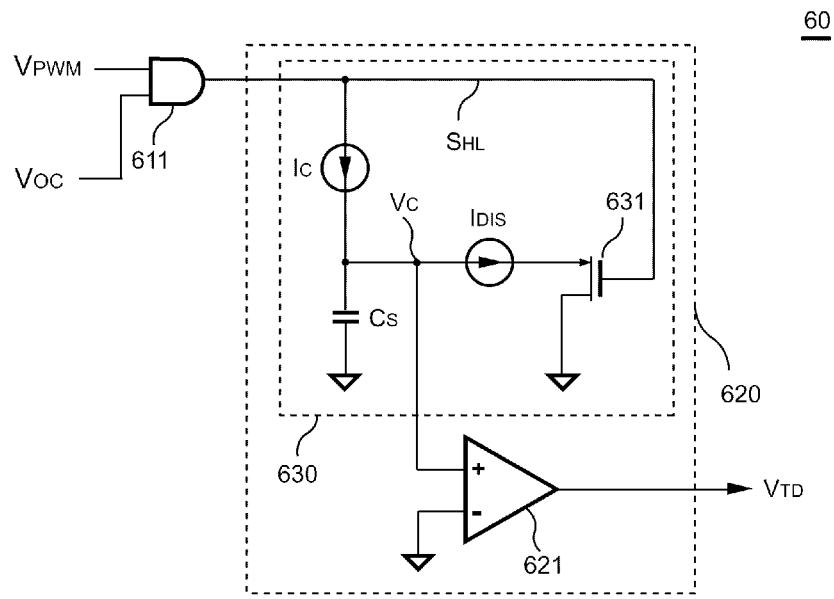
FIG. 4 shows the delay modulator in accordance with the invention.

FIG. 4 shows the delay modulator in accordance with the invention. The delay modulator 60 comprises a state-detect unit 611 and a delay-adjusted unit 620. The state-detect unit 611 is coupled to the control circuit 30 for generating a state signal $S_{HL}$ in response to the PWM signal $V_{PWM}$ and the over current signal $V_{OC}$. The state-detect unit 611 can be implemented by an AND gate. The delay-adjusted unit 620 is coupled to the state-detect unit 611 for generating the delay control signal $V_{TD}$ in response to the state signal $S_{HL}$. The delay-adjusted unit 620 comprises a saw-tooth circuit 630 and a correction circuit 621. The saw-tooth circuit 630 is coupled to the state-detect unit 611 for generating a saw-tooth signal $V_C$ in accordance with the state signal $S_{HL}$. The saw-tooth circuit 630 comprises a charge circuit and a discharge circuit.

The charge circuit includes a charge current $I_C$ and a capacitor $C_S$. The capacitor $C_S$ is coupled to the state-detect unit 611 through the charge current $I_C$. When both of the PWM signal $V_{PWM}$ and the over current signal $V_{OC}$ are logic-high, the state signal $S_{HL}$ is a high-level. Once the state signal $S_{HL}$ is high and the capacitor $C_S$ is charged by the charge current $I_C$, a slope of the saw-tooth signal $V_C$ will be rising. However, the charge circuit is for charging the capacitor $C_S$ in response to the high-level of the state signal $S_{HL}$. As mentioned above, the over current signal $V_{OC}$ is logic-high in accordance with the current sense signal $V_{CS}$ is lower than the limit signal $V_M$ through the comparator 31.

The discharge circuit includes a discharge current $I_{DIS}$ and a discharge switch 631. The discharge current $I_{DIS}$ is coupled to the charge circuit for receiving the saw-tooth signal $V_C$ and coupled to the state-detect unit 611 for receiving the state signal $S_{HL}$ through the discharge switch 631. When the PWM signal $V_{PWM}$ or the over current signal $V_{OC}$ is logic-low, the state signal $S_{HL}$ is a low-level. Once the state signal $S_{HL}$ is low and the capacitor $C_S$ is discharged by the discharge current $I_{DIS}$ through the discharge switch 631, a slope of the saw-tooth signal $V_C$ is falling. Furthermore, the discharge circuit is for discharging the capacitor $C_S$ in response to the low-level of the state signal $S_{HL}$. As mentioned above, the over current signal $V_{OC}$ is logic-low in accordance with the current sense signal $V_{CS}$ is higher than the limit signal $V_M$ through the comparator 31. The correction circuit 621 is coupled to the saw-tooth circuit 630 for generating the delay control signal $V_{TD}$ once the saw-tooth signal $V_C$ is higher than a ground level. The correction circuit 621 can be implemented by a comparator.

Figure 5:
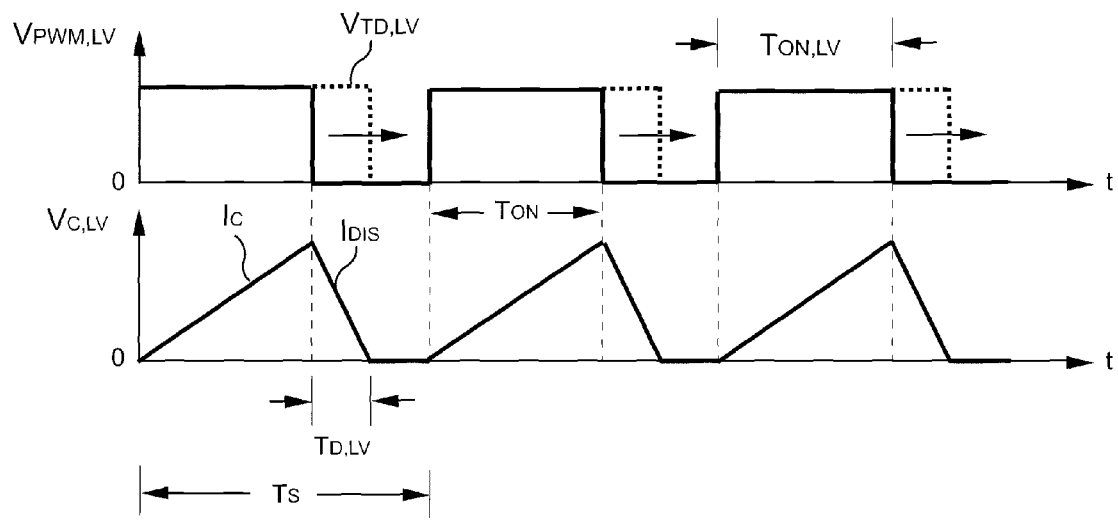
FIG. 5 shows the waveforms of the PWM controller in the low-line input voltage according to the invention.

FIG. 5 shows the waveforms of the PWM controller in the low-line input voltage according to the present invention. Referring to FIG. 3 and FIG. 4, in the low-line input voltage, the PWM signal $V_{PWM,LV}$ keeps a longer on-time $T_{ON,LV}$ to generate a higher saw-tooth signal $V_{C,LV}$. Based on the higher saw-tooth signal $V_{C,LV}$, a longer propagation delay time $T_{D,LV}$ is generated when the power switch $Q_1$ is turned off. In other words, both of the charge current $I_C$ and the discharge current $I_{DIS}$ are lasted a long period, and then result the higher saw-tooth signal $V_{C,LV}$ and the longer on-time $T_{ON,LV}$.

Figure 6:
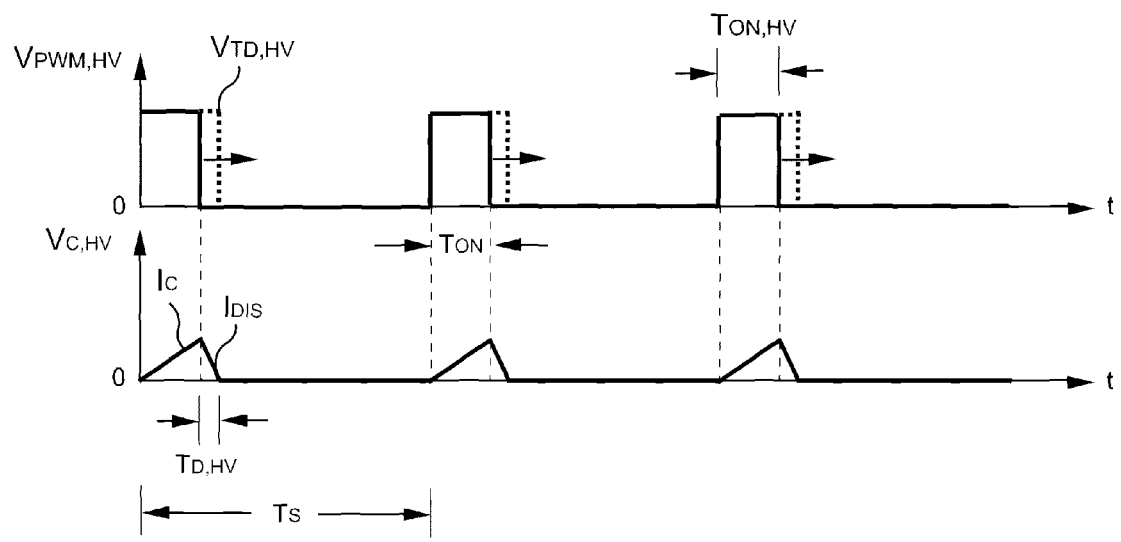
FIG. 6 shows the waveforms of the PWM controller in the high-line input voltage according to the invention.

FIG. 6 shows the waveforms of the PWM controller in the high-line input voltage according to the present invention. Referring to FIG. 3 and FIG. 4, in the high-line input voltage, the PWM signal $V_{PWM,HV}$ keeps a shorter on-time $T_{ON,HV}$ to generate a lower saw-tooth signal $V_{C,HV}$. Based on the lower saw-tooth signal $V_{C,HV}$, a shorter propagation delay time $T_{D,HV}$ is generated when the power switch $Q_1$ is turned off. In other words, both of the charge current $I_C$ and the discharge current $I_{DIS}$ are lasted a short period, and then result the lower saw-tooth signal $V_{C,LV}$ and the shorter on-time $T_{ON,HV}$.

Comparing to FIG. 5 and FIG. 6, the on-time $T_{ON,LV}$ of the PWM signal $V_{PWM,LV}$ in the low-line input voltage is longer than the on-time $T_{ON,HV}$ of the PWM signal $V_{PWM,HV}$ in the high-line input voltage, the propagation delay time $T_{D,LV}$ in the low-line input voltage is longer than the propagation delay time $T_{D,HV}$ in the high-line input voltage. Therefore, during the period of the low-line input voltage, the longer on-time $T_{ON,LV}$ causes the longer propagation delay time $T_{D,LV}$ in accordance with the higher saw-tooth signal $V_{C,LV}$. During the period of the high-line input voltage, the shorter on-time $T_{ON,HV}$ causes the shorter propagation delay time $T_{D,HV}$ in accordance with the lower saw-tooth signal $V_{C,HV}$. From the above description, the maximum output power under the high-line input voltage and the heavy-load condition can be compensated properly, such that the difference between the low-line and high-line input voltage does not affect the maximum output power, an identical maximum output power for the low-line and high-line input voltage can be achieved.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A power converter for compensating a maximum output power, comprising:

a power switch, coupled to a primary winding of the power converter for switching a power transformer, and the power transformer being supplied with an input voltage of the power converter;

an oscillator, generating a pulse signal;

a control circuit, coupled to the oscillator for generating a pulse-width modulation (PWM) signal and an over current signal in response to the pulse signal and a current sense signal of the power converter, wherein the PWM signal controls the power switch, and the over current signal is activated for cycle-by-cycle limiting an on-time of the PWM signal once the current sense signal is higher than a limit signal; and a delay modulator, coupled to the control circuit for generating a delay control signal in response to the PWM signal and the over current signal, wherein the delay control signal is used to prolong a propagation delay time of the control circuit in response to the on-time of the PWM signal, and the propagation delay time can be compensated by the on-time of the PWM signal to limit the maximum output power under a high-line input voltage and a heavy-load condition, and the propagation delay time can be adjusted to achieve an identical maximum output power between a low-line input voltage and the high-line input voltage.

2. The power converter of claim 1, wherein the on-time of the PWM signal is correlated to an amplitude of an input voltage.

3. The power converter of claim 2, wherein the on-time of the PWM signal is decreased in response to the increase of the input voltage, and the on-time of the PWM signal is increased in response to the decrease of the input voltage.

4. The power converter of claim 1, wherein the propagation delay time of the high-line input voltage is shorter than the propagation delay time of the low-line input voltage.

5. The power converter of claim 1, wherein the delay modulator comprises:

a state-detect unit, coupled to the control circuit for generating a state signal in response to the PWM signal and the over current signal; and a delay-adjusted unit, coupled to the state-detect unit for generating the delay control signal in response to the state signal.

6. The power converter of claim 5, wherein the delay-adjusted unit comprises:

a saw-tooth circuit, coupled to the state-detect unit for generating a saw-tooth signal in accordance with the state signal; and a correction circuit, coupled to the saw-tooth circuit for generating the delay control signal once the saw-tooth signal is higher than a ground level.

7. The power converter of claim 6, wherein the saw-tooth circuit comprises:

a charge circuit, coupled to the state-detect unit for generating the saw-tooth signal in response to a high-level of the state signal, wherein the high-level of the state signal is generated in accordance with a logic-high of the PWM signal and the over current signal; and a discharge circuit, coupled to the state-detect unit and the charge circuit for discharging the saw-tooth signal in response to a low-level of the state signal, wherein the low-level of the state signal is generated in accordance with a logic-low of the PWM signal or the over current signal.

8. A pulse-width modulation (PWM) controller for compensating a maximum output power of a power converter, comprising:

an oscillator, for generating a pulse signal;

a control circuit, coupled to the oscillator for generating a PWM signal and an over current signal in response to the pulse signal and a current sense signal of the power converter, wherein the PWM signal controls a power switch, and the over current signal is activated for cycle-by-cycle limiting an on-time of the PWM signal once the current sense signal is higher than a limit signal; and a delay modulator, coupled to the control circuit for generating a delay control signal in response to the PWM signal and the over current signal, wherein the delay control signal is used to prolong a propagation delay time of the control circuit in response to the on-time of the PWM signal, and the propagation delay time can be compensated by the on-time of the PWM signal to limit the maximum output power under a high-line input voltage and a heavy-load condition, and the propagation delay time can be adjusted to achieve an identical maximum output power between a low-line input voltage and the high-line input voltage.

9. The PWM controller of claim 8, wherein the on-time of the PWM signal is correlated to an amplitude of an input voltage.

10. The PWM controller of claim 9, wherein the on-time of the PWM signal is decreased in response to the increase of the input voltage, and the on-time of the PWM signal is increased in response to the decrease of the input voltage.

11. The PWM controller of claim 8, wherein the propagation delay time of the high-line input voltage is shorter than the propagation delay time of the low-line input voltage.

12. The PWM controller of claim 8, wherein the delay modulator comprises:

a state-detect unit, coupled to the control circuit for generating a state signal in response to the PWM signal and the over current signal; and a delay-adjusted unit, coupled to the state-detect unit for generating the delay control signal in response to the state signal.

13. The PWM controller of claim 12, wherein the delay-adjusted unit comprises:

a saw-tooth circuit, coupled to the state-detect unit for generating a saw-tooth signal in accordance with the state signal; and a correction circuit, coupled to the saw-tooth circuit for generating the delay control signal once the saw-tooth signal is higher than a ground level.

14. The PWM controller of claim 13, wherein the saw-tooth circuit comprises:

a charge circuit, coupled to the state-detect unit for generating the saw-tooth signal in response to a high-level of the state signal, wherein the high-level of the state signal is generated in accordance with a logic-high of the PWM signal and the over current signal; and a discharge circuit, coupled to the state-detect unit and the charge circuit for discharging the saw-tooth signal in response to a low-level of the state signal, wherein the low-level of the state signal is generated in accordance with a logic-low of the PWM signal or the over current signal.

* * * * *